US006352790B1

(12) United States Patent
Eaton et al.

(10) Patent No.: US 6,352,790 B1
(45) Date of Patent: Mar. 5, 2002

(54) SUBSTRATE CONTAINING SILICON AND A BARRIER LAYER WHICH FUNCTIONS AS A PROTECTIVE/THERMAL BARRIER COATING

(75) Inventors: Harry E. Eaton, Woodstock; Stephen Chin, Wallingford; John J. Brennan, Portland, all of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/606,912

(22) Filed: Jun. 29, 2000

(51) Int. Cl.$^7$ .............................. B52B 19/00; B52B 9/00
(52) U.S. Cl. ..................... 428/689; 428/697; 428/702; 428/446; 501/8; 501/123; 501/125

(58) Field of Search .................................. 428/446, 469, 428/472, 472.2, 632, 633, 701, 629, 688, 689, 697, 702; 501/8, 32, 123, 125

(56) References Cited

U.S. PATENT DOCUMENTS 5,214,004 A * 5/1993 Bansal ........................... 501/8
5,741,596 A * 4/1998 Skowronski et al. ........ 428/457
5,985,470 A * 11/1999 Spitsberg et al. ........... 428/689

* cited by examiner

Primary Examiner—Deborah Jones
Assistant Examiner—Jason Vincent V. de la Peña
(74) Attorney, Agent, or Firm—Bachman & LaPointe, P.C.

(57) ABSTRACT

A barrier layer for a silicon containing substrate comprises an alkaline earth aluminosilcate and an additive component capable of forming a reaction product with silica.

11 Claims, 4 Drawing Sheets

SILICON

"A"

SUBSTRATE CONTAINING SILICON AND A BARRIER LAYER WHICH FUNCTIONS AS A PROTECTIVE/THERMAL BARRIER COATING

BACKGROUND OF THE INVENTION

The present invention relates to an article comprising a substrate containing silicon and a barrier layer which functions as a protective environmental and/or thermal barrier coating which inhibits the formation of gaseous species of Si, particularly $Si(OH)_x$ when the article is exposed to a high temperature, aqueous (water and/or steam) environment and, more particularly, a barrier layer having an additive component which is capable of forming a reaction product with free silica thereby prohibiting a reaction between free silica and the barrier coating.

Ceramic materials containing silicon and metal alloys containing silicon have been proposed for structures used in high temperature applications as, for example, gas turbine engines, heat exchangers, internal combustion engines, and the like. A particularly useful application for these materials is for use in gas turbine engines which operate at high temperatures in aqueous environments. It has been found that these silicon containing substrates can recede and lose mass as the result of formation of volatile Si species, particularly $Si(OH)_x$ and SiO when exposed to high temperature, aqueous environments. For example, silicon carbide when exposed to a lean fuel environment of approximately 1 ATM pressure of water vapor at 1200° C. will exhibit weight loss and recession at a rate of approximately 6 mils per 1000 hrs. It is believed that one possible reaction mechanism involves oxidation of the silicon carbide to form silica and carbon monoxide and/or carbon dioxide on the surface of the silicon carbide followed by reaction of the silica with steam to form volatile species of silicon such as $Si(OH)_x$. Other mechanisms are possible such as direct oxidation of SiC to $Si(OH)_x$ species by steam. A barrier coating for silicon containing substrates which would form a reaction product with the silica created during the oxidation of the silicon carbide and thus inhibit the formation of volatile species of silicon, namely, $Si(OH)_x$ and SiO, is known. In accordance with the invention, an additive is made to the barrier layer which additive reacts with any free silica. This prohibits reaction between silica and the barrier layer which results in a low melting point problem. Free silica occurs from two sources: (1) deposits on the surface of the barrier layer from the environment, i.e. sand, and (2) because the barrier layer works well, oxidation of the silicon containing substrate leads to silica which is stable because the barrier layer prevents water from getting to that surface.

Accordingly, it is the principle object of the present invention to provide an article comprising a silicon containing substrate with a barrier layer which includes an additive component capable of forming a reaction product with free silica and thereby inhibit the formation of reactions between the barrier layer components and silica.

Further objects and advantages of the present invention will appear hereinbelow.

SUMMARY OF THE INVENTION

The present invention relates to an article comprising a silicon containing substrate having a barrier layer on the substrate, wherein the barrier layer functions to both inhibit the formation of undesirable gaseous species of silicon when the article is exposed to a high temperature, aqueous environment and to provide thermal protection such as exists in a gas turbine combustion environment. By high temperatures is meant the temperature at which the Si in the substrate forms $Si(OH)_x$ and/or SiO in an aqueous environment. By aqueous environment is meant a water and/or steam environment. The silicon containing substrate is preferably a ceramic or metal alloy containing silicon. The barrier layer in accordance with the present invention comprises an aluminosilicate selected from the group consisting of barium aluminosilicate, strontium aluminosilicate and barium strontium aluminosilicate and an additive component capable of forming a reaction product with free silica. It is preferred in accordance with the present invention that the aluminosilicate is alkaline earth based such as barium strontium aluminosilicate comprising 0.75 BaO.0.25 SrO.$Al_2O_3$.2SiO2. The additive component in accordance with the present invention is selected from the group consisting of $Al_2O_3$, BaO.$6Al_2O_3$, BaO.$Al_2O_3$, SrO.$6Al_2O_3$, SrO.$Al_2O_3$ and mixtures thereof. The alkaline earth based aluminosilicate plus additive can also be referred to as non-stoichiometric BAS, BSAS, or SAS in that it is substoichiometric with respect to silica. The barrier layer in accordance with the present invention has an increased capacity for silica over barrier layers heretofore known. By the addition of the additive component, roughly 32 more silica may be tolerated when compared to a barium strontium aluminosilicate barrier layer without the additive component.

DETAILED DESCRIPTION

Figure 1:
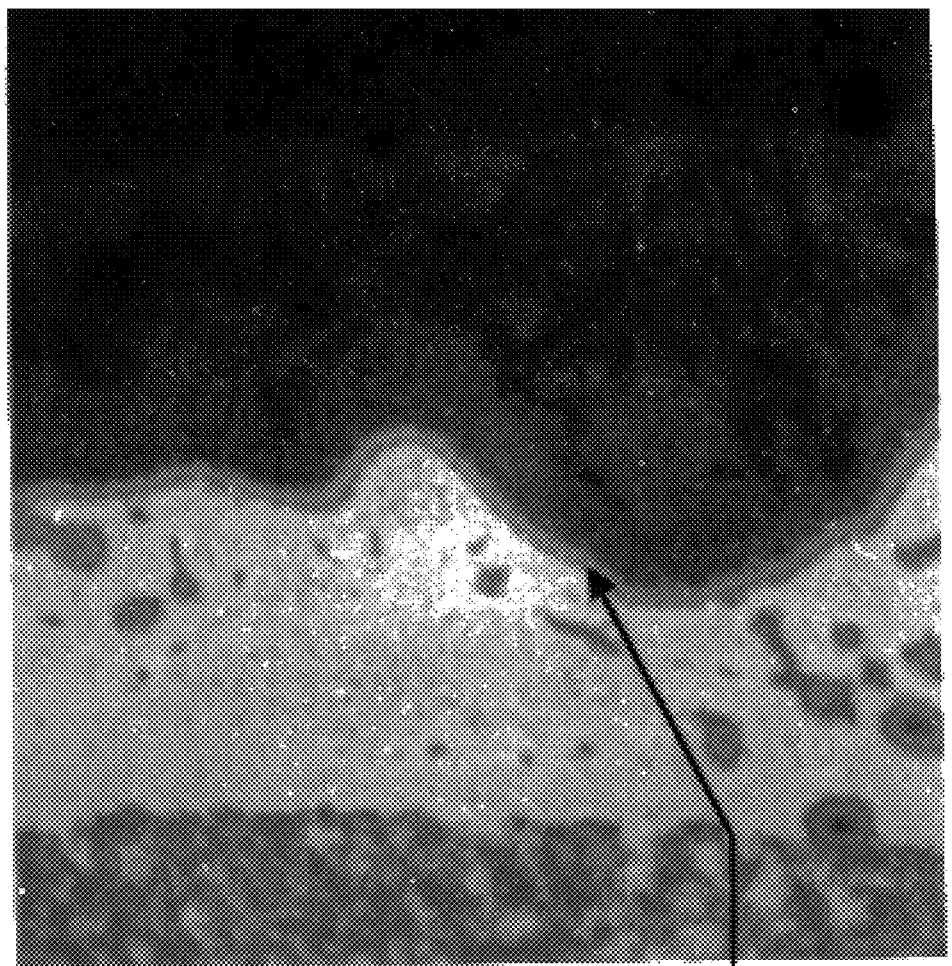
FIGS. 1 through 3 are photomicrographs showing high resolution electron microprobe images and compositional maps of a barrier layer coating of the present invention.

The present invention relates to an article comprising a silicon containing substrate and a barrier layer, wherein the barrier layer inhibits the formation of gaseous species of silicon when the article is exposed to a high temperature, aqueous environment by preventing water from reaching the silicon containing surface and by reducing oxidation of that surface. In addition, the present invention also contains an additive in the barrier layer to react with any silica formed to prevent reactions between the free silica and the barrier layer.

According to the present invention, the silicon containing substrate may be a silicon containing ceramic substrate or a silicon containing metal alloy. In a preferred embodiment, the silicon containing substrate is a silicon containing ceramic material as, for example, silicon carbide, silicon nitride, silicon carbon nitride, silicon oxynitride and silicon aluminum oxynitride. In accordance with a particular embodiment of the present invention, the silicon containing ceramic substrate comprises a silicon containing matrix with reinforcement such as fibers, particles, and the like and, more particularly, a silicon carbide based matrix which is fiber-reinforced. Particularly suitable ceramic substrates are a silicon carbide coated silicon carbide fiber-reinforced silicon carbide particle and silicon matrix, a carbon fiber-reinforced silicon carbide matrix and a silicon carbide fiber-reinforced silicon nitride matrix. Particularly useful silicon-metal alloys for use as substrates for the article of the present invention include molybdenum-silicon alloys, molybdenum-silicon-boron alloys, niobium-silicon alloys, and other Si containing alloys having a coefficient of thermal expansion compatible with the barrier layer of the present invention.

Barrier layers particularly useful in the article of the present invention are aluminosilicate selected from the group consisting of alkaline earths such as barium aluminosilicate, strontium aluminosilicate and barium strontium aluminosilicate layers with additive component capable of forming a reaction product with free silica. In accordance with a preferred embodiment of the present invention the barrier layer is a barium strontium aluminosilicate comprising $0.75\ BaO \cdot 0.25SrO \cdot Al_2O_3 \cdot 2SiO_2$. The additive component in the barrier layer is selected from the group consisting of $Al_2O_3$, $BaO \cdot 6Al_2O_3$, $BaO \cdot Al_2O_3$, $SrO \cdot 6Al_2O_3$, $SrO \cdot Al_2O_3$ and mixtures thereof. The preferred composition of the barrier layer depends on the particular additive component used. In a preferred embodiment of the present invention, the barrier layer comprises up to 50% by weight of the additive component with the balance essentially barium strontium aluminosilicate. A preferred barrier layer comprises up to 30% by weight of the additive component. It has been found that when $Al_2O_3$ is used as the additive component, the $Al_2O_3$ may be present up to 30 and preferably from about 10 to 25.

While it is preferred to add as much of the additive component as possible so as to maximize the formation of the silica and additive reaction product, the upper limit of the additive component is limited in that the coefficient of thermal expansion of the barrier layer must be compatible with the silicon containing substrate material. Thus, depending on the chemical composition of the additive component, the maximum of each additive component in the barrier layer will vary. As noted above, when $Al_2O_3$ is the additive component, the barrier layer may contain up to 30 $Al_2O_3$. When $BaO \cdot 6Al_2O_3$ is the additive component, the barrier layer may likewise contain up to 30 $BaO \cdot 6Al_2O_3$, and preferably between about 10 to 25 percent $BaO \cdot 6Al_2O_3$. When $BaO \cdot Al_2O_3$ is used as the additive component, the additive component may be present in an amount up to 40 and, preferably, between 25 to 35. When $SrO \cdot 6Al_2O_3$ is the additive component, the barrier layer may likewise contain up to 30 wt. % $SrO \cdot 6Al_2O_3$, and preferably between about 10 to 25 wt. % $SrO \cdot 6Al_2O_3$. When $SrO \cdot Al_2O_3$ is used as the additive component, the additive component may be present in an amount up to 40 wt. % and, preferably, between 25 to 35 wt. %.

Again, as noted above, it is important to maintain comparability between the coefficient of thermal expansion of the silicon containing substrate and the barrier layer. The coefficient of thermal expansion of the barrier layer should be within ±3.0 ppm per degrees centigrade of the coefficient of thermal expansion of the silicon containing substrate.

The barrier layer should be present in the article at a thickness of greater than or equal to about 0.5 mils, preferably between about 3 to about 30 mils and ideally between about 3 to about 5 mils. The barrier layer may be applied to the silicon based substrate by any suitable manner known in the art.

The advantages in the article of the present invention will become clear from consideration of the following example.

EXAMPLE

Figure 2:
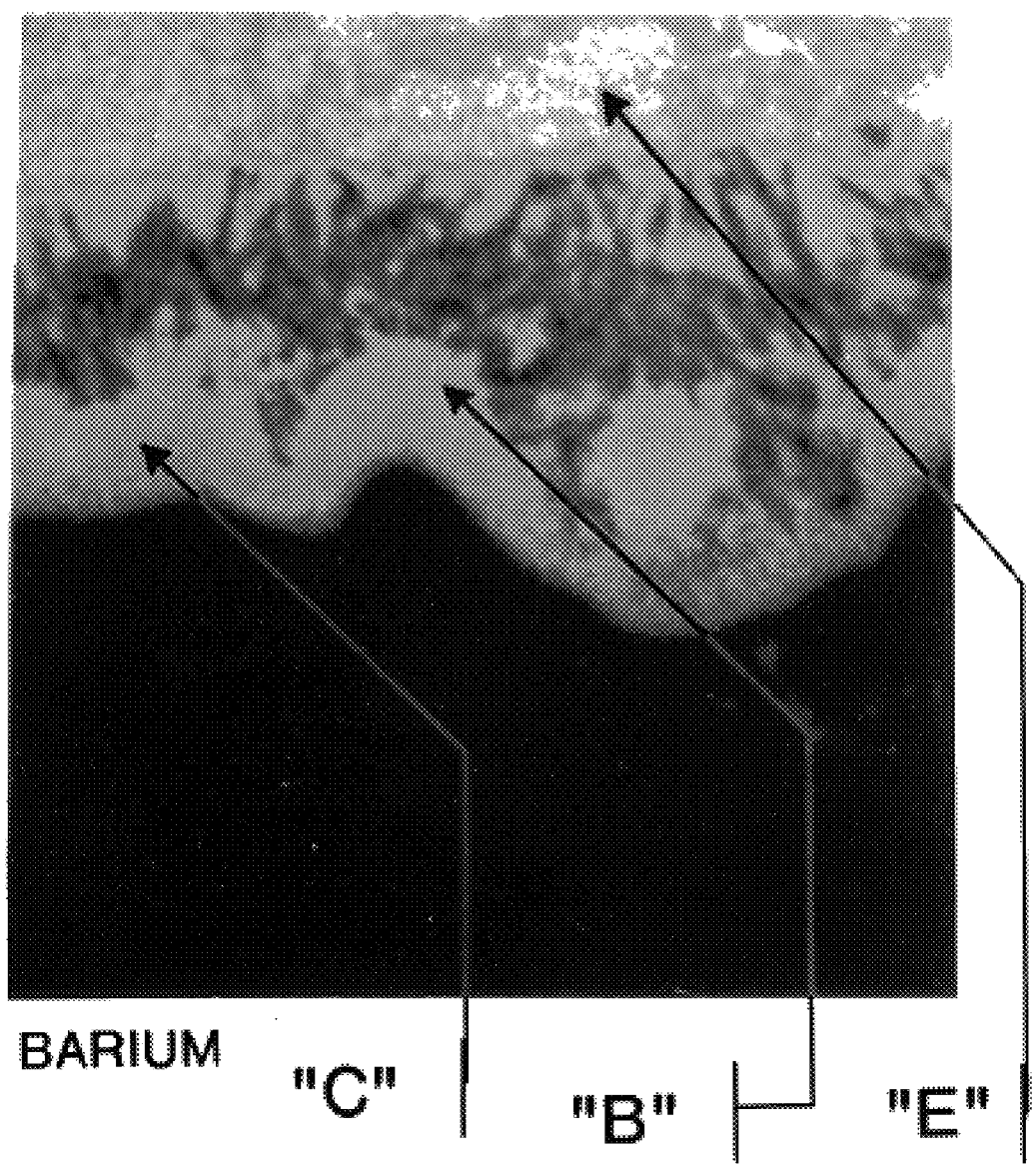
Figure 3:
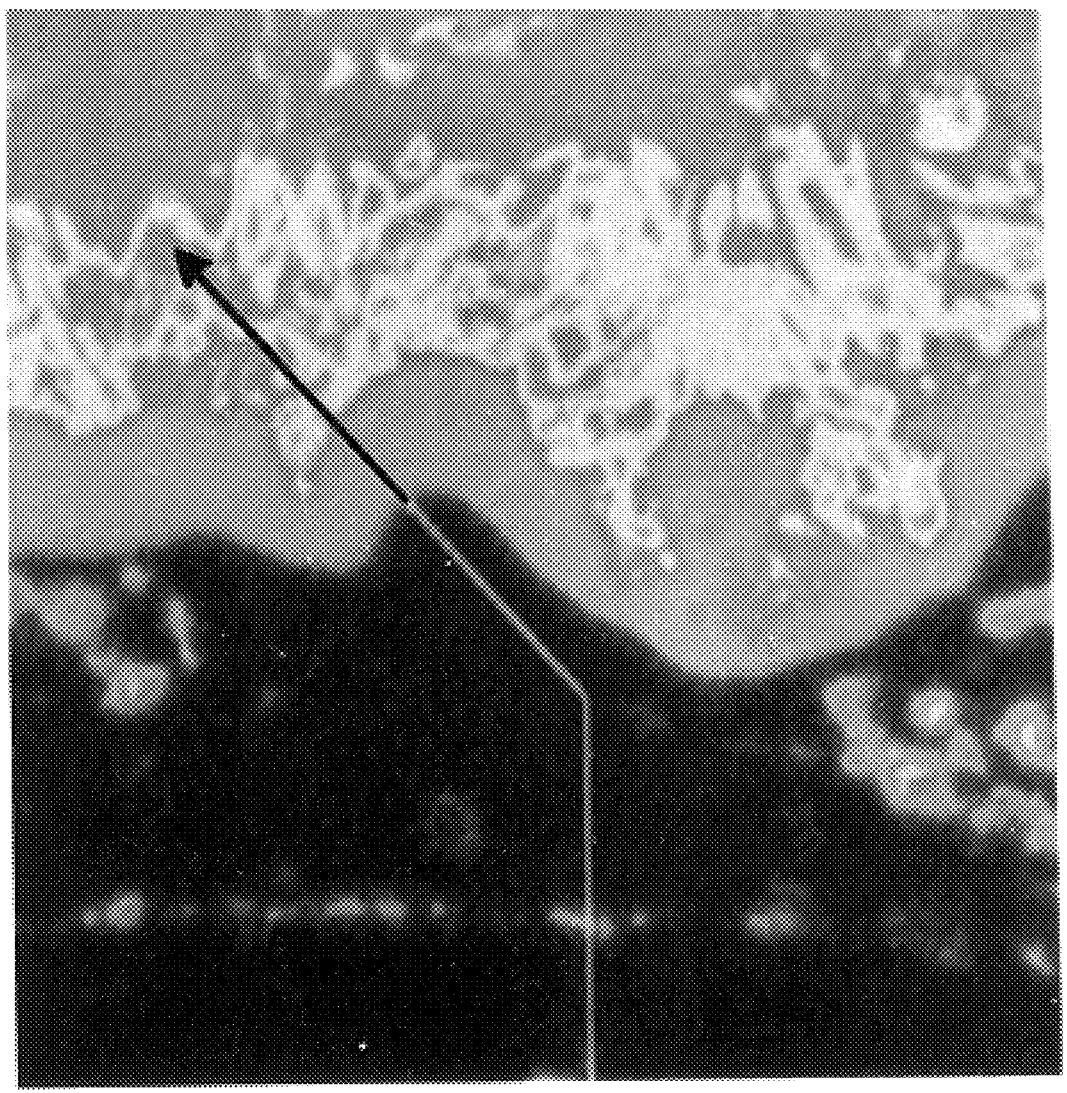
Figure 4:
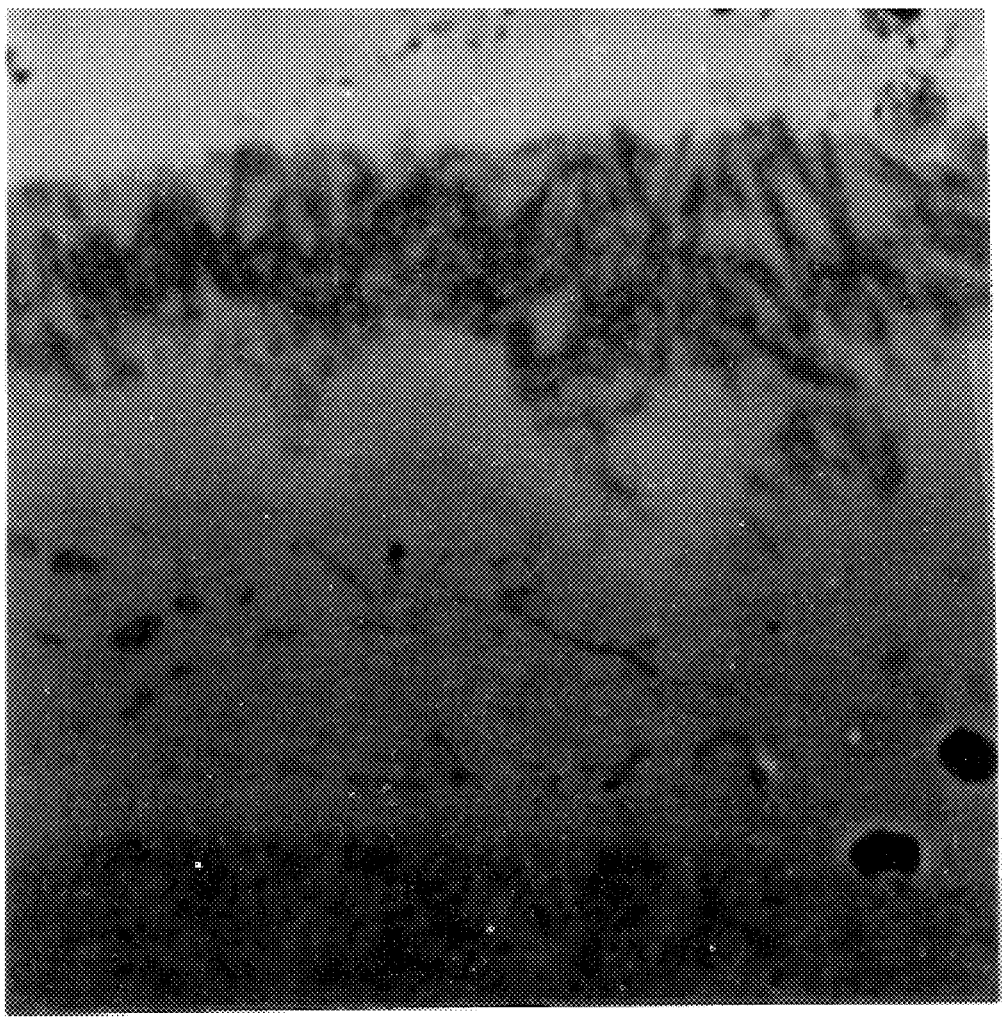
FIG. 4 is a high resolution electron microscope image of the microstructure of FIGS. 1 through 3.

A silicon substrate was coated with a barrier layer of barium strontium aluminosilicate comprising $0.75\ BaO \cdot 0.25SrO \cdot Al_2O_3 \cdot 2SiO_2$ having an additive component of 15 $Al_2O_3$. FIGS. 1 through 4 show high resolution electron microprobe images and compositional x-ray maps for barium, strontium, aluminum, and silicon along with analyses of each phase present in atomic percent composition at the interface between a SiC/SiC composite and the barium strontium aluminosilicate coating plus 15% alumina additive after 100 hrs. exposure in air at 1350° C. Phase "A" (see composition in Table 1) is a thin silica layer forming on the silica former and having the composition $SiO_2$. Above the silica, phases "B" and "C." (see Table 1) are aluminum silicates having a nominal composition of $AlSi_4O_{18}$ or $1/2Al_2O_3 \cdot 4SiO_2$. It is expected that $1/2Al_2O_3 \cdot 4SiO_2$ would be very refractory and have a melting point greater than 1700° C. based on the three phase $Al_2O_3 \cdot BaO \cdot SiO_2$ diagram (FIG. 556, "Phase Diagrams for Ceramists", M. Resor—Editor, The American Ceramic Society, Columbus, Ohio). The 1.2 to 1.6% Ba and 0.1 to 0.2% Sr seen in the $1/2Al_2O_3 \cdot 4SiO_2$ phase could lower the melting point slightly but it would still remain substantially above 1600° C. Phase "D" is an aluminum silicate having the nominal composition $Al_6Si_2O_{12}$ which is $3Al_2O_3 \cdot 2SiO_2$ and is commonly known as mullite. Mullite is also a very refractory material having a melting point above 1800° C. (see the above reference). The 0.1% Ba seen in phase "D" (see Table 1) is expected to have very little effect on the melting point of the mullite. Finally, phase "E" (see Table 1) is the barium strontium aluminosilicate plus alumina additive that represents the present invention. The example shows that the reaction between the invention and a silica former under high temperature oxidizing conditions results in the formation of high temperature refractory phases rather than low temperature phases such as barium aluminosilicate plus silica which has a melting point of about 1300° C. (see above reference, FIG. 4544).

TABLE 1

Atomic Composition Percentages of Phases A, B, C, D, E FIGS. 1–4

| Phase | A% (O) | A% (Al) | A% (Si) | A% (Sr) | A% (Ba) |
|-------|--------|---------|---------|---------|---------|
| A | 66.4 | 0.9 | 32.5 | 0.0 | 0.3 |
| B | 64.6 | 7.4 | 26.3 | 0.2 | 1.6 |
| C | 64.8 | 7.0 | 26.8 | 0.1 | 1.2 |
| D | 62.0 | 27.7 | 10.1 | 0.0 | 0.1 |
| E | 59.9 | 16.7 | 15.4 | 2.1 | 5.9 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An article comprising:
   a substrate comprising silicon; and
   a barrier layer comprising an alkaline earth aluminosilicate selected from the group consisting of barium aluminosilicate, strontium aluminosilicate and barium strontium aluminosilicate with an additive component capable of forming a reaction product with free silica said additive component is selected from the group consisting of $Al_2O_3$, $BaO \cdot 6Al_2O_3$, $BaO \cdot Al_2O_3$, $SrO \cdot 6Al_2O_3$, $SrO \cdot Al_2O_3$, and mixtures thereof.

2. An article according to claim 1 wherein said aluminosilicate is barium strontium aluminosilicate comprising $0.75BaO \cdot 0.25\ SrO \cdot Al_2O_3 \cdot 2SiO_2$.

3. An article according to claim 1 wherein said barrier layer comprises up to 50% by wt. of said additive component, balance essentially barium strontium aluminosilicate.

4. An article according to claim 1 wherein said barrier layer comprises up to 30% by wt. of said additive component, balance essentially barium strontium aluminosilicate.

5. An article according to claim 2 wherein said barrier layer comprises up to 30% by wt. of said additive component, balance essentially barium strontium aluminosilicate.

6. An article according to claim 2 wherein said additive component is $Al_2O_3$ up to 30% by wt.

7. An article according to claim 6 wherein said barrier layer comprises from about 10 to 25% by wt. $Al_2O_3$, balance essentially barium strontium aluminosilicate.

8. An article according to claim 2 wherein said additive component is up to 30% by wt. $BaO.6Al_2O_3$ or $SrO.6Al_2O_3$.

9. An article according to claim 2 wherein said additive component comprises from about 10 to 25% by wt. $BaO.6Al_2O_3$ or $SrO.6Al_2O_3$, balance essentially barium strontium aluminosilicate.

10. An article according to claim 2 wherein said additive component comprises from about 40% by wt. $BaO.Al_2O_3$ or $SrO.Al_2O_3$, balance essentially barium strontium aluminosilicate.

11. An article according to claim 2 wherein said additive component comprises from about 10 to 25% by wt. $BaO.Al_2O_3$ or $SrO.Al_2O_3$, balance essentially barium strontium aluminosilicate.

* * * * *